July 10, 1928.  1,676,525
E. CONTI
SHOCK ABSORBING MEANS FOR AUTOMOBILES
Filed Nov. 22, 1926
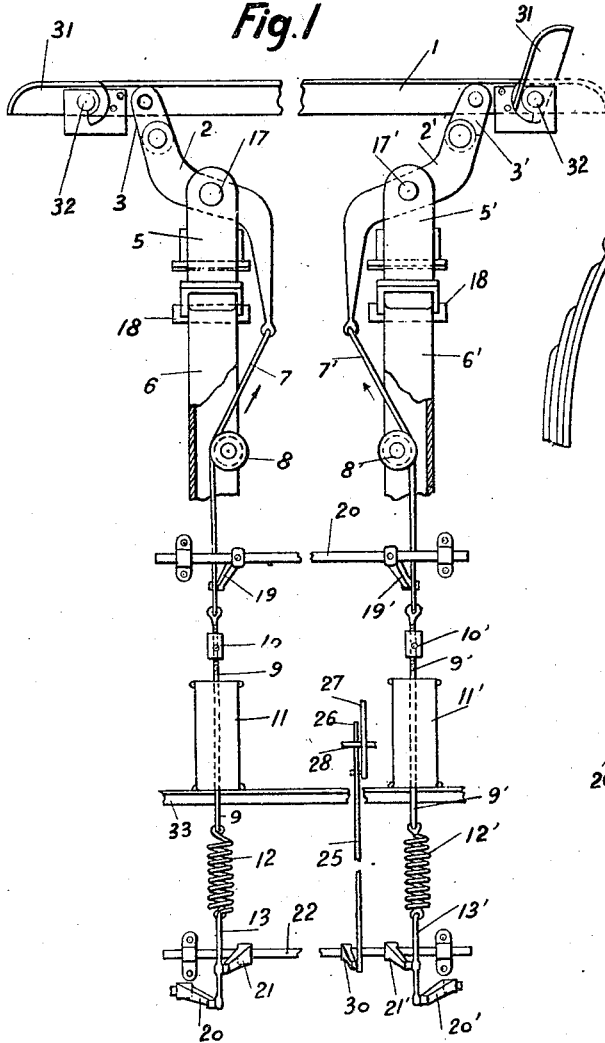
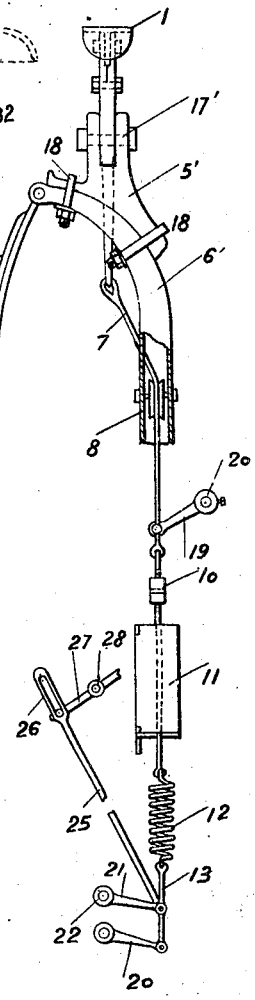
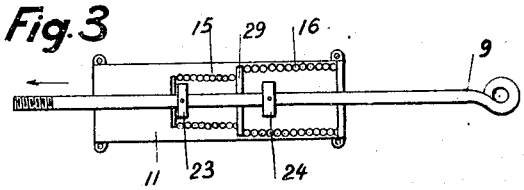
Witnesses:
Gentizon Robert
Guillemin Armand
Inventor:
Emile Conti
per Fred F. Barlow
Attorney Patented July 10, 1928.

1,676,525

UNITED STATES PATENT OFFICE.

EMILE CONTI, OF ALFORTVILLE, FRANCE.

SHOCK-ABSORBING MEANS FOR AUTOMOBILES.

Application filed November 22, 1926, Serial No. 150,000, and in France November 28, 1925.

The present invention relates to shock absorbing means for automobiles designed to protect the important parts of such vehicles from being damaged in the case of collision with another vehicle or some other body.

The characteristic feature of the invention resides in the fact that the parts of the shock absorber are arranged in such a way as to absorb shocks in a totally different manner from what is the case with existing apparatus. As a matter of fact, with existing apparatus the shocks are partly absorbed by buffering springs and partly by the chassis.

In the case of the present invention, the shocks are absorbed by side springs located in planes parallel to the longitudinal axis of the vehicle and transmitted to these springs by means of jointed levers. Owing to this fact, the chassis is, so to speak, protected from any possible shocks which are completely absorbed by powerful springs even in the case of violent collision.

When, by reason of the faulty operation of the brakes or through the carelessness of the driver, the vehicle presses against the forward portion of the mechanism, that is to say in the longitudinal direction of the axis of the vehicle, the apparatus takes up the shock which is transmitted by means of caps to pivoted levers, which latter become automatically displaced by turning upon their axles. At this moment, the springs placed at the extremities of the said levers and proportioned to the load of the vehicle extend or compress as the case may be thus allowing the driver of the vehicle to bring the brake into action by hand, in order to stop the vehicle.

Contrary to what is the case with all present existing shock absorbers, the present one can operate through a considerable length before the mechanism comes to the end of its path.

Moreover this arrangement leaves free or almost entirely free the part located between the two frame beams or side members of the chassis, enabling access to be obtained by the chauffeur to the handle of the starting gear without interference from the shock absorbers.

After coming into action the apparatus returns immediately and automatically to its original position because it is brought back to that position by the springs.

The annexed drawing shows, by way of example, one constructional embodiment of the invention.

Fig. 1 is a plan of the shock absorber mounted on a chassis and with automatic brake means.

Fig. 2 is a side elevation.

Fig. 3 is a detailed section of the box containing the springs.

The shock absorber comprises the bar 1 carried by levers 2, 2' by means of hinged pieces 3, 3'.

The levers 2, 2' are pivotally mounted on the supports 5, 5' by means of spindles 17, 17'. Said levers are of the "first class" type and the fulcrum point 17 is placed at such a point that one lever arm is substantially twice that of the other for each lever. These supports are mounted on the members 6 and 6' by means of stirrup pieces 18 or by any other suitable means.

The extremities of the levers 2 and 2' are connected to shock absorbing springs by means of steel cables 7 and 7' passing over grooved pulleys 8 and 8' located on the side struts of the vehicle. Stretchers 10, 10' are provided for regulating the tension of these cables which are attached to levers 19 and 19' of the shaft 20 so as to produce interconnection between the two spring boxes 11 and 11' so that they may work together even if only one of the levers 2 is influenced by a shock.

The stretchers 10, 10' are attached to rods 9 and 9' passing through the spring boxes 11 and 11' fixed to the strut 33 of the chassis and which are connected to springs 12 and 12'.

The last mentioned springs are in turn connected to rigid rods 13 and 13' attached to pivoted levers 20' and 20. These levers 20' and 20 control directly the rear brakes. The brakes on the front wheels are controlled by rods attached with the use of small levers to the shaft 22 according to the particular arrangement for each type of vehicle.

The levers 21 and 21' which are attached to the shaft 22 are connected by the lever 30 to the rod 25 provided at its extremity with a guideway 26 attached to the lever 27 of the hand brake. This lever is pivotally mounted on a spindle 28 in a known manner. The arrangement just described allows for the brake to be taken off the vehicle as afterwards explained.

The boxes 11 and 11' contain the sets of springs intended to absorb the shock. The sets comprise two or more springs 15 and 16, the first spring being weaker than the second. In the rest position, the collar 23 in connection with the spring 15 is located as shown at Fig. 3, that is to say it is ready to operate the said spring 15. The collar 24 of the spring 16 only comes into action after the stressing of the spring 15. The position of the two collars can be regulated with respect to the rod 9.

The whole apparatus functions in the following manner.

When a shock acts upon the bar 1, the resulting force brings the two levers 2 and 2' simultaneously into action, and these latter turn upon their pivots 17 and 17'.

The cables 7 and 7' move in the direction of the arrows and the shock is in the first instance absorbed by the springs 15 which are stretched. The force continues to be absorbed by the second spring 16 which is more powerful and which is operated by the collar 24.

The shock produced is thus entirely absorbed by the springs 15 and 16 and moreover the automatic stoppage of the automobile is instantaneously effected before the second spring 16 comes into action.

The brake mechanism comes into operation in the following manner.

When the bar 1 of the apparatus comes into violent contact with any obstacle, the bent levers 2 and 2' separate owing to the play of the hinged pieces 3 and 3'. The cables 7 and 7' are pulled forward thus transmitting directly the shock to the springs 15. The force of the shock is partly absorbed owing to the fact that the arms of each of the bent levers 2 and 2' are of different lengths. During the movement of the bar 1, the cables 7 and 7' have moved through a path of travel which is double to that of the bar and have displaced the rods 9 and 9'. The collars 23 fixed to the said rods stretch the springs 15 whilst changing the position of the brake levers 20 and 20' and that without bringing the springs 12 and 12' into action.

The vehicle is thus brought under the action of a brake from the first moment when the shock takes place. By reason of the violence of the shock, the cables are again pulled and at this moment, the collars 24 come against the intermediate plate 29 of the springs 16. The force of the shock is absorbed to the same extent as previously, by the springs 16. The levers 20 and 20' of the brake being at the end of their course, the springs 12 and 12' now extend permitting the rods 9 and 9' to continue their movement.

If the shock is not central, that is to say when it is produced at one of the sides of the bar 1, say the left-hand portion, the lever 2 alone comes into operation pulling the cable 7. In order to avoid the possibility of the shock, which may be as violent at the extremities as at the centre of the apparatus being in this case buffered only by one of the sets of springs, the cable 7 is connected to the cable 7' through the two levers 19 and 19' mounted on the shaft 20, the bearings being on the frame beams of the chassis. The result of this arrangement is that whatever the point of application of the shock, the apparatus functions completely through the shaft 20 and the levers 19 and 19', that is to say the vehicle is instantaneously stopped by the brake before the buffering apparatus has come entirely into action. The shock resulting from a collision is diminished to a like extent and its principal point of application is at the middle point of the frame beams or side members of the chassis, that it at the very point where the boxes 11 and 11' are attached thus avoiding all deformation of the forward springs.

When by reason of a shock the vehicle is stopped it is not possible to move it without taking off the brakes.

For this purpose there has been provided a shaft 22 upon which are mounted levers 21 and 21' which are in fixed connection with the operating rods 13 and 13', as already explained. At the moment when by reason of the operation of the apparatus the rods 13 and 13' move longitudinally, they operate the levers 21 and 21' thus causing the shaft 22 to turn. The lever 30 being also fixed to this shaft, causes through the rod 25 and the guideway 26, which allows for the manœuvring of the brakes without affecting the shock absorber, the displacement of the operating lever of the handbrake 27 which owing to this fact comes into the braking position.

To remove the brake from the vehicle it suffices therefore to bring back the lever of the hand brake 27 into the off position, the vehicle moving back automatically under the pressure of the springs 15 and 16. The object of this manœuvre is to bring back the brake levers 20 and 20' to their original positions thus removing the forward brakes, the rear brakes and the servo-brakes. It is assisted by the supplementary tension of the springs 12 and 12' in a direction opposite to their first displacement.

It is to be observed that without varying in any way the principles of the present invention, the pairs of springs 15 and 16 may be replaced by compression devices of any type. All modifications resulting from the employment of the compression devices come within the scope of the present invention.

The extremities 31 of the shock absorbing bar 1 are pivotally mounted on spindles 32 so as to prevent damage to the bar by catching in anything when moving backwards. In fact, the extremity 31 turning upon its pivot 32 moves forward describing a circular arc as indicated at Fig. 1 on the drawings.

What I claim and desire to secure by Letters Patent of the United States of America is:—

1. In a motor propelled vehicle having a chassis, the combination of a plurality of pivotally mounted levers at the front end of said chassis, a transverse bumper hinged to said levers, a plurality of shock absorbers carried by said chassis, flexible means interconnecting said levers and said shock absorbers and means associated with said first mentioned means for causing the movement of a single lever to be transmitted to each of said shock absorbers when said bumper is displaced.

2. In a motor propelled vehicle having a chassis, the combination of a plurality of pivotally mounted levers at the front end of said chassis, a transverse bumper hinged to said levers, a plurality of shock absorbers carried by said chassis, flexible means interconnecting said levers and said shock absorbers, a transverse shaft carried by the chassis and a plurality of levers on said shaft associated with said means for causing the movement of one of said first mentioned levers to be transmitted to each of said shock absorbers when said bumper is displaced.

3. In a motor propelled vehicle having a chassis and a brake, the combination of a transverse bumper hinged to the front end of said chassis a plurality of longitudinally movable rods carried by said chassis, movement reversing means interconnecting said rods and said bumper, a plurality of concentrically mounted shock absorbing springs surrounding said rods, means on each of said rods for successively rendering said springs operative as the displacement of said rods is increased and means for transmitting the movement of said rods to said brake when said springs have been rendered operative.

4. In a motor propelled vehicle having a chassis and a brake, the combination of, a transverse bumper hinged to the front end of said chassis, a plurality of movable rods on said chassis, movement reversing means interconnecting said rods and said bumper, a plurality of concentrically mounted shock absorbing springs surrounding said rods, means on each of said rods for successively rendering said springs operative as the displacement of said rods is increased, a manually operated brake lever, means for transmitting the movement of said rods to said brake lever when said springs have been rendered operative and for permitting said brake lever to be operated independently of said rods.

5. In a motor propelled vehicle having a chassis and a brake, the combination of, a transverse bumper hinged to the front end of said chassis, a plurality of movable rods on said chassis, movement reversing means interconnecting said rods and said bumper, a plurality of concentrically mounted shock absorbing springs surrounding said rods, means on each of said rods for successively rendering said springs operative as the displacement of said rods is increased, a manually operated brake lever, a transverse shaft, a plurality of levers interconnecting said shaft and said rods, an additional lever on said shaft, a connecting rod pivoted to said additional lever, a slot on said connecting rod and a pin on said brake lever engaging said slot whereby said brake lever may be operated independently of said rods.

6. In a motor propelled vehicle having a chassis, the combination of a bumper, a plurality of shock absorbers and means pivotally connected to said bumper and said chassis for transmitting rotational displacement of said bumper in either direction to all of said shock absorbers.

7. In a motor propelled vehicle having a chassis and a brake, the combination of a bumper, a plurality of shock absorbers, means pivotally connected to said bumper and said chassis for transmitting rotational displacement of said bumper in either direction to all of said shock absorbers and means operated by said first mentioned means for operating said brake during operation of said shock absorbers.

In witnes whereof I affix my signature.

EMILE CONTI.